United States Patent [19]
Black

[11] 3,934,843
[45] Jan. 27, 1976

[54] FREE WING FOR CONVERTIBLE AIRCRAFT STRUCTURE

[76] Inventor: John O. Black, 18094 Parkside, Detroit, Mich. 48221

[22] Filed: Aug. 5, 1974

[21] Appl. No.: 494,855

[52] U.S. Cl.................................. 244/7 C; 244/48
[51] Int. Cl.²........................................ B64C 27/28
[58] Field of Search.......... 244/7 C, 7 R, 7 A, 12 A, 244/12 R, 56, 66, 48

[56] References Cited
UNITED STATES PATENTS

| | | | |
|---|---|---|---|
| 1,735,872 | 11/1929 | O'Neill | 244/7 C |
| 2,382,824 | 8/1945 | Solomon | 244/7 C |
| 2,702,172 | 2/1955 | Focke | 244/7 C X |
| 2,708,081 | 5/1955 | Dobson | 244/7 C |
| 2,959,373 | 11/1960 | Zuck | 244/7 C |
| 3,029,043 | 4/1962 | Churchill | 244/56 X |
| 3,179,352 | 4/1965 | Nelson | 244/7 C |
| 3,430,894 | 3/1969 | Strand et al. | 244/7 C |

*Primary Examiner*—Trygve M. Blix
*Assistant Examiner*—Galen L. Barefoot
*Attorney, Agent, or Firm*—Harness, Dickey & Pierce

[57] ABSTRACT

A convertible airplane having an outboard engine supported at each side of the airplane fuselage on a spar that is angularly adjusted through 90° from a horizontal to a vertical position for operating propellers both for a helicopter and for an airplane. A wing section is provided between the fuselage and each engine which is freely pivotable on each spar and which has thrust bearings between the ends and the adjacent portions of the fuselage and engine cowling. This permits the wing to swing on the spar to assume a direction of attack so that the air will pass smoothly over the wing sections without any eddy currents at the rear edge and in the area therebeyond which detracts from the airplane lift. With this arrangement the engines may be swung from a horizontal to a vertical position to function as a helicopter for raising the airplane vertically during which time the wing sections will assume a vertical position. As the propellers and drive means are tilted to move the airplane in the direction of travel, the component of horizontal movement will produce the swinging of the wing section to a proper direction of attack and provide lift so that by the time the propellers are moved to a vertical position with the engines horizontal the wing sections will be in horizontal position and provide the lift required for flight.

2 Claims, 4 Drawing Figures

U.S. Patent  Jan. 27, 1976  3,934,843
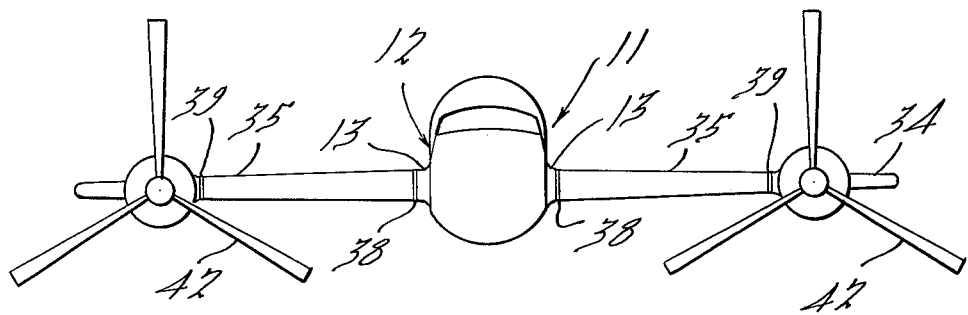
FIG. 1.
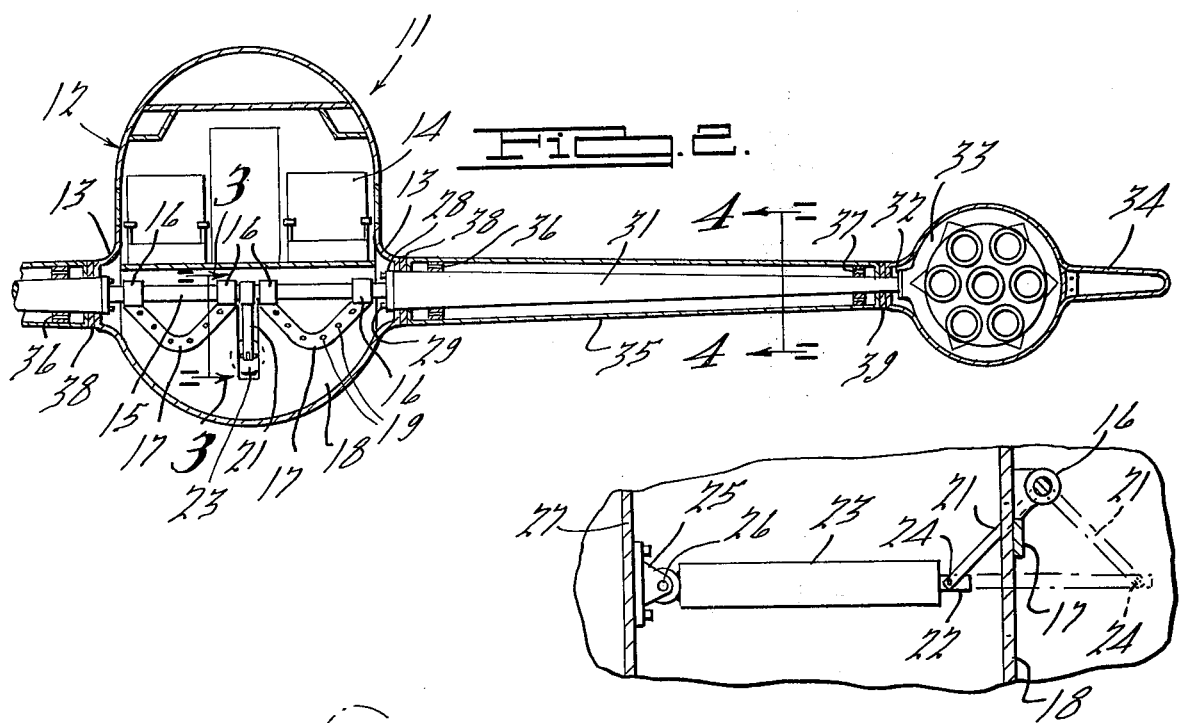
FIG. 2.
FIG. 3.
FIG. 4.

FREE WING FOR CONVERTIBLE AIRCRAFT STRUCTURE

BACKGROUND OF THE INVENTION

Reference may be had to the patent to F. A. Dobson, No. 2,708,081 issued May 10, 1955 for Convertible Aircraft Structure, and to U.S. Pat. No. 3,494,706 disclosing helicopter flap wings to show similar prior art structures.

SUMMARY OF THE INVENTION

The invention pertains to an airplane having a fuselage with an outboard engine at each side which are supported by a spar which tapers to a smaller diameter at the outer ends. The spars are interconnected by a shaft across the fuselage where an actuating arm extends downwardly. A ram having the remote end of the cylinder pivoted to a wall and the piston rod extending from the opposite end pivoted to the arm so that the extension and retraction of the piston rod from and into the cylinder swings the spars and the engines at the end thereof through 90° from a horizontal to a vertical position so as to have the airplane function as a helicopter for a vertical takeoff with the engines rotating in opposite directions. The wing sections are mounted on bearings on the spars with thrust bearings at the end for reducing as much friction as possible so that the wing sections are freely swingable. The weight preponderance of the trailing edge of the wing sections causes the edges to hang downwardly so that the vertical ascent of the airplane can occur without too much wind resistance. The wing sections will automatically rotate toward a horizontal position as the engine and propellers are tipped at an angle which not only produces a lift but also a forward movement to the airplane. As the engines are further angularly disposed to approach a horizontal position, the wings will similarly move toward the horizontal position and provide a maximum lift which permits the horizontal flight of the airplane with the wings in a true horizontal position. This results in a smooth flight, a maximum lift and a minimum drag resulting in the greatest efficiency during the operation as an airplane. If found desirable to fix the wings, releasable locking mechanisms can be employed to releasably secure the wings to the stub wing sections in flight position.

BRIEF DESCRIPTION OF THE DRAWING

FIG. 1 is a view in front elevation of an airplane having rotatable wing sections thereon embodying features of the present invention;

FIG. 2 is a sectional view through the fuselage and one wing section and engine of the structure illustrated in FIG. 1;

FIG. 3 is an enlarged sectional view of the structure illustrated in FIG. 2, taken on the line 3—3 thereof, and FIG. 4 is an enlarged sectional view of the structure illustrated in FIG. 2, taken on the line 4—4 thereof.

DESCRIPTION OF THE PREFERRED EMBODIMENT

An airplane 11 has a fuselage 12 containing stub wing sections 13 at the lower forward part thereof. The fuselage has a floor 14 for the cabin which contains seats, storage areas and the like provided in the conventional manner. Below the floor a shaft 15 is supported on a plurality of bearings 16 which are mounted on brackets 17 secured to a wall 18 by a plurality of rivets 19 or like securing elements. The shaft 15 has an arm 21 thereon the outer end of which is secured by a pivot 24 to the end of a piston rod 22 which is movable within a cylinder 23. The rear end of the cylinder is secured by a pivot 26 to a bracket 25 which is mounted on a transverse wall 27 within the bottom of the fuselage. The shaft 15 has a head 28 on each end which are secured by bolts 29 to the large end of tapered spars 31 the opposite ends of which has a head 32 which are bolted or otherwise secured to engines 33 which are supported thereby. The outboard side of the engine supports a stub winged section 34 which is aligned with a wing section 35 when disposed in horizontal position. The wing sections 35 are mounted on the spars 31 on a pair of bearings 36 and 37. Thrust bearings 38 and 39 are mounted between the ends of wing sections 35 and the wing stub sections 13 and the engines 33. The wing section 35 is mounted in this manner for free swinging movement with a slight preponderance of weight toward the rear wing edge 41 so as to have the wing sections assume a substantially vertical position when at rest, as shown in the dot and dash line position in FIG. 4. When a takeoff is to be made vertically, the spars 31 are rotated 90° to have the engines disposed vertically with propellers 42 carried by the engine shafts located in an overhead horizontal position so as to provide lift to the spars 31 for raising the airplane upwardly from the ground with the wing sections in the dot and dash position as illustrated in FIG. 4. After the airplane has been raised a sufficient distance the engines are tipped forwardly toward the direction in which the airplane is to be flown which provides a forward component of movement to the fuselage which causes the wing sections 35 to rotate counterclockwise to be in a position to provide some lift to the airplane which balances the reduced lift from the propellers after being tilted. As the engines are continuously tilted toward horizontal position the wings will continue to rotate counterclockwise toward a horizontal position to provide maximum lift as the propellers no longer produce lift to the airplane. The lift by the wing sections 35 increase as they approach a horizontal position and will provide a maximum amount of lift and a minimum amount of drag at the wing rear edge and therebeyond due to the lack of eddy currents. While the rotatable wing sections are illustrated herein in combination with the outboard engine supports which are rotatable to move the engine and propellers from a horizontal position to a vertical position to function as a helicopter, it is to be understood that the wing sections may be employed on the wings of an airplane where the engines are mounted on the fuselage or tail section or both and may embody the entire length of wing or a fractional part thereof. The advantage of the rotatable wing sections resides in the maximum lift obtained thereby with the smallest amount of drag due to the presence of eddy currents. Such eddy currents occur at the rear edge of the wing and therebeyond when the wings are tilted by the fuselage from the proper angle of approach for a horizontal or climb position.

I claim:

1. In an airplane construction, a fuselage, a spar extending from each side of the fuselage near the bottom thereof, a wing section pivotably mounted on each spar with the weight preponderance at the trailing edge which extends downwardly, a straight shaft extending across the fuselage, enlarged flanges on the ends of said shaft, means for removably securing said flanges to the adjacent ends of said spars, power means for rotating said shaft through an angle of approximately 90°, an engine supported on each outer end of the spars which are turned to move the engines to and from vertical and horizontal position, propeller means supported on the driving shaft of said engines for rotation thereby, and thrust bearings provided at each end of the wing sections adjacent to said fuselage and said engines.

2. In an airplane as recited in claim 1, wherein a first transverse partition is provided at the bottom portion of the fuselage, bearing means supported by said first partition which supports said straight shaft, said power means is a ram, a second transverse partition at the bottom portion of the fuselage spaced from said first partition, and pivot means on said second partition and said ram with the piston rod thereof extending through an aperture through said first partition for rotating said straight shaft.

* * * * *